US005392693A

United States Patent [19]

Engel et al.

[11] Patent Number: 5,392,693

[45] Date of Patent: Feb. 28, 1995

[54] PISTON ASSEMBLY FOR A FLUID TRANSLATING DEVICE

[75] Inventors: William K. Engel, Peoria; James C. Goade, Morris; Michael H. Haselkorn, Peoria; Donald H. Sherman, Morton, all of Ill.

[73] Assignee: Caterpillar Inc., Peoria, Ill.

[21] Appl. No.: 204,831

[22] Filed: Mar. 2, 1994

[51] Int. Cl.[6] .................................................. F16J 9/00

[52] U.S. Cl. .......................................... 92/248; 92/172; 92/128; 403/74; 403/76; 403/130; 403/179; 403/404

[58] Field of Search .................... 92/187, 129, 71, 248, 92/172; 403/74, 76, 122, 130, 179, 404; 417/269

[56] References Cited

U.S. PATENT DOCUMENTS

| | | | |
|---|---|---|---|
| 3,787,128 | 1/1974 | Maistrelli | 403/122 |
| 3,893,375 | 7/1975 | Hein et al. | 91/486 |
| 4,732,047 | 3/1988 | Kato et al. | 403/404 |
| 5,038,673 | 8/1991 | Schulze | 92/248 |
| 5,056,417 | 10/1991 | Kato et al. | 92/71 |

FOREIGN PATENT DOCUMENTS

| | | | |
|---|---|---|---|
| 2438444 | 2/1975 | Germany | 92/187 |
| 172478 | 10/1983 | Japan | 92/222 |

*Primary Examiner*—Thomas E. Denion

*Attorney, Agent, or Firm*—J. W. Burrows

[57] ABSTRACT

Piston assemblies for use in fluid translating devices normally are made of hardened metal alloy materials which require very smooth surface and are always subject to varying degrees of thermal expansion when being operated at high operating temperatures. In the subject arrangement, a piston assembly is provided and is constructed of most, if not all, ceramic components. The piston assembly includes a ceramic piston having a spherical head portion at one end thereof which rests in a spherical cavity of a ceramic slipper and held therein by a cylindrical ring. The cylindrical ring can be of a one-piece or a two-piece design which is in contact with the spherical head portion and bonded to the ceramic slipper, thus, retaining the spherical head portion. The cylindrical ring could also be made of a metallic material. The metallic ring is bonded to the ceramic slipper and subsequently swaged to hold the spherical head portion within the spherical cavity. The subject ceramic piston assembly provides a very smooth surface which reduces sliding friction and likewise the effects of thermal expansion and inertia are minimized by the use of a ceramic material. Consequently, the subject piston assembly is very efficient when operating at high temperatures and, likewise, is easy to manufacture and assemble.

5 Claims, 6 Drawing Sheets

PISTON ASSEMBLY FOR A FLUID TRANSLATING DEVICE

TECHNICAL FIELD

This invention relates generally to a piston assembly for use in a fluid translating device such as a pump or a motor and more particularly to the structure of the piston assembly.

BACKGROUND ART

Piston assemblies normally used are made of steel and various components of the piston assembly are hardened to increase their wear life. In the known piston assemblies, a slipper is pivotally connected to a piston so that one part can pivot relative to the other part. In most all known piston assemblies, a spherical cavity is in one of the components and a spherical ball is located on the other component. Upon assembly, the spherical ball is placed in the spherical cavity and retained therein by swaging a portion of the metal of the component having the cavity around a portion of the spherical ball to retain the spherical ball in cavity. In other applications, a snap ring is located in the cavity to retain the spherical ball in the spherical cavity. During operation of the known piston assemblies, they are subjected to large amounts of heat that is generated by the piston reciprocating in a bore of a barrel and the slipper sliding on the surface of a swashplate. With the large amount of heat being generated during operation, suitable clearance must be provided between the diameter of the piston and the diameter of the bore in the barrel so that they can move relative to one another without seizing, yet not allow execessive leakage. The wear rate between the piston and the barrel must be minimized to prevent loss of efficiency over a period of time and the piston and the bore in which it reciprocates must be precisely finished in order to reduce the sliding friction and/or wear therebetween. As is well known, it is beneficial to minimize the weight of the moving components in order to reduce their inertia.

The present invention is directed to overcoming one or more of the problems as set forth above.

DISCLOSURE OF THE INVENTION

In one aspect of the present invention, a piston assembly is provided and adapted for use in a fluid translating device. The piston assembly includes a ceramic piston, a ceramic slipper, and a cylindrical ring. The ceramic piston has a cylindrical body with a spherical head disposed at one end of the cylindrical body. The ceramic slipper has a substantially flat surface at one end and a spherical cavity defined in the other end. The spherical cavity being of a size sufficient to matingly receive the spherical head of the ceramic piston. The cylindrical ring is fixedly bonded to the ceramic slipper adjacent the spherical cavity and has a retaining surface disposed on the cylindrical ring. The retaining surface is operative to engage a portion of the spherical head to retain the spherical head in the spherical cavity.

The present invention provides a piston assembly that has major components thereof made from ceramic materials that allow them to be made with closer clearances which helps offset the leakage, plus the ceramic material aids in reducing the sliding friction between the components. The ceramic parts lasts longer than steel parts since, as is well known, ceramic material has a longer wear life. Since ceramic parts are lighter per unit volume than steel parts, the inertia of the ceramic parts is consequently lower. Furthermore, the cylindrical ring that is fixedly bonded to the ceramic slipper allows the piston to be secured to the slipper in an easy and efficient manner.

BEST MODE FOR CARRYING OUT THE INVENTION

Figure 1:
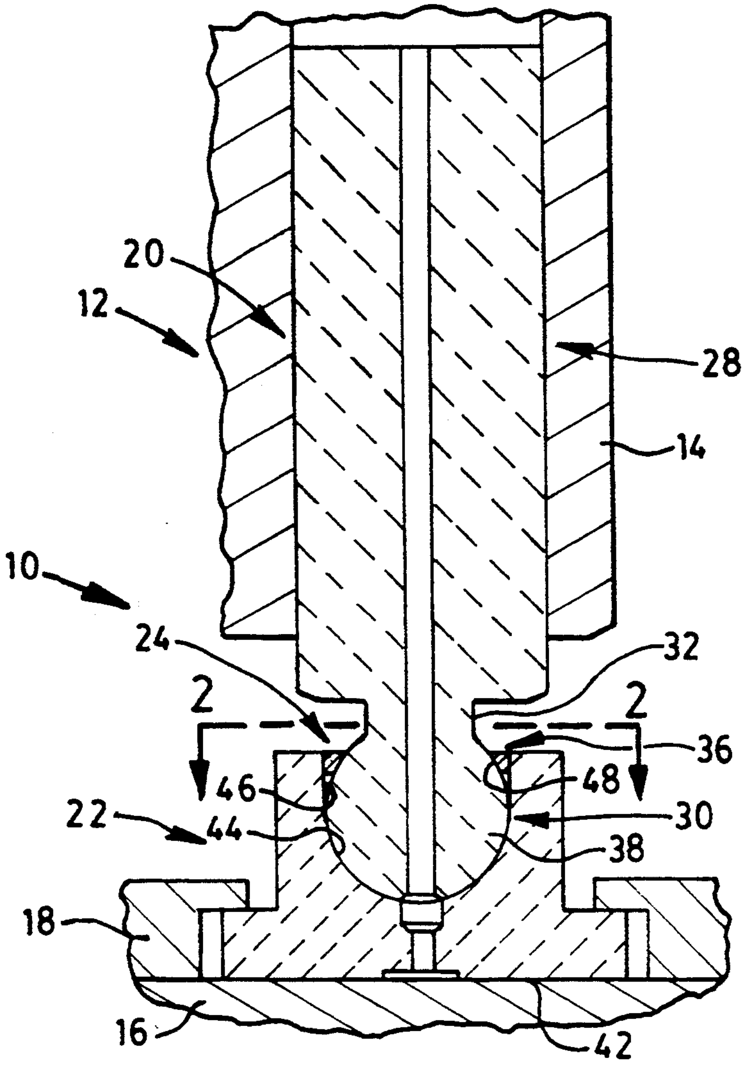
FIG. 1 is a diagrammatic representation of a piston assembly illustrating an embodiment of the present invention.
Figure 2:
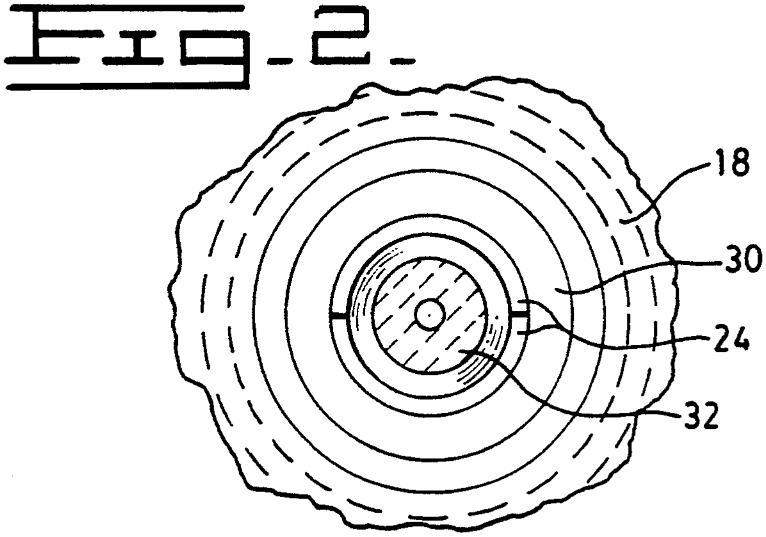
FIG. 2 is a cross-sectional view taken along the lines 2—2 of FIG. 1.

Referring to the drawings, more particularly to FIGS. 1 and 2, a piston assembly 10 is illustrated and adapted for use in a fluid translating device 12 (partially shown). The portions of the fluid translating device 12 that are partially illustrated herein are portions of a barrel 14, a swashplate 16 and a retainer 18. Fluid translating devices 12, such as hydraulic pumps and/or hydraulic motors having piston assemblies therein are well known to one skilled in the art. Likewise, the operation of a fluid translating device is well known and additional details of the operation will not be set forth herein.

The piston assembly 10 includes a ceramic piston 20, a ceramic slipper 22, and a cylindrical ring 24. The ceramic piston 20 is a one piece piston having a cylindrical body 28 with a spherical head portion 30 connected to one one end thereof by a shaft 32. The spherical head portion 30 located at the one end of the cylindrical body 28 is composed of a ceramic spherical head member 36 which includes a spherical head 38 and the shaft 32 which extends from the spherical head 38.

The ceramic slipper 22 has a substantially flat surface 42 at one end thereof and a spherical cavity 44 is defined therein at the other end thereof. The spherical cavity 44 is of a size sufficient to receive the spherical head 38 of the ceramic piston 20 and has a cylindrical surface 46 disposed thereon generally at the entrance thereof.

The cylindrical ring 24 of the subject embodiment is made from a ceramic material but it is recognized that it could be made from a metallic material without departing from the essence of the invention. The cylindrical ring 24 is fixedly bonded to the cylindrical surface 46 of the ceramic slipper 22. The cylindrical ring 24 has a retaining surface 48 that is operative to engage a portion of the spherical head 38 to retain the spherical head 38 in the spherical cavity 44. As more clearly illustrated in FIG. 2, the retaining ring 24 is a two-piece split ring.

Figure 3:
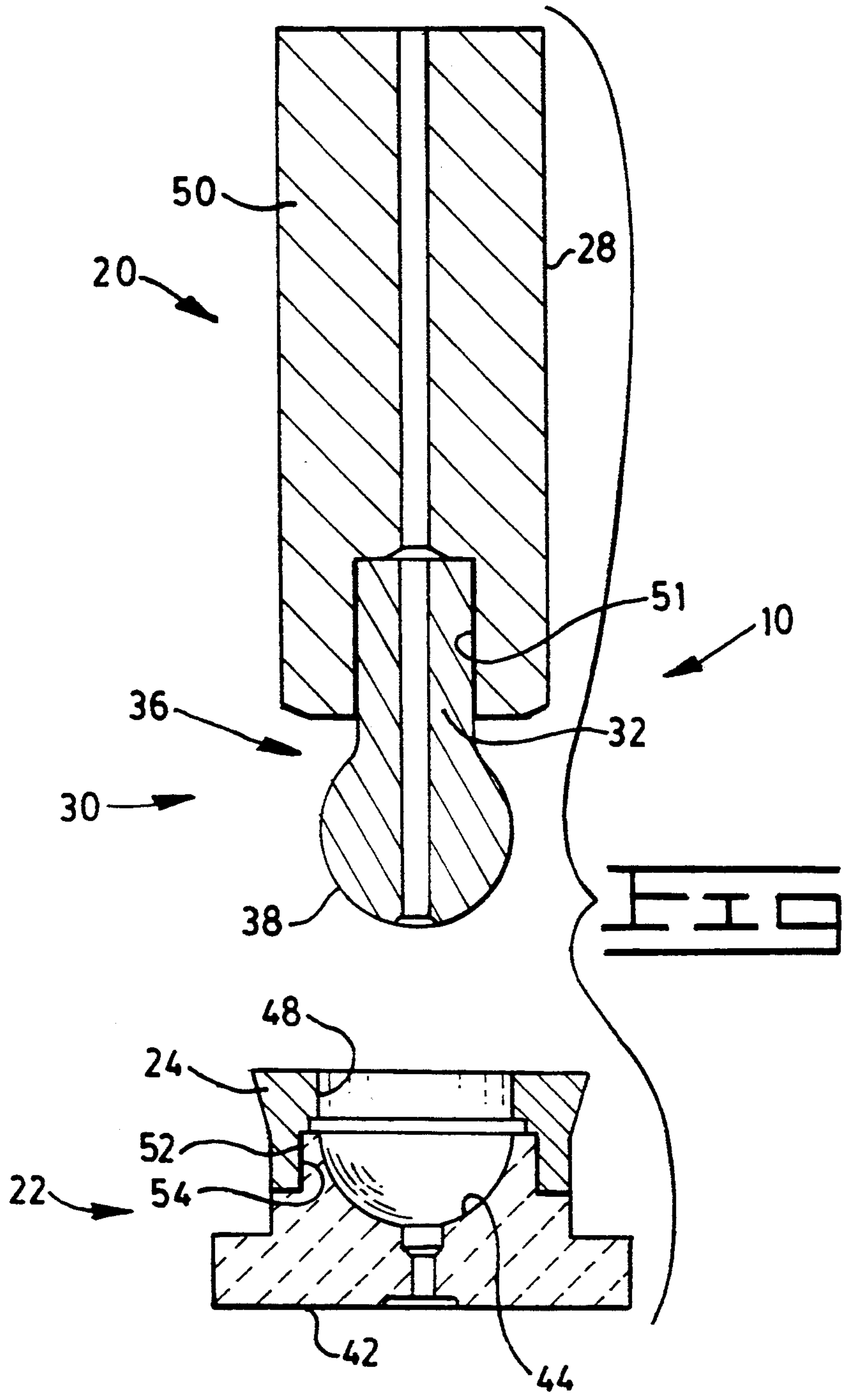
FIG. 3 is a diagrammatic representation of another embodiment of the present invention illustrating some of the elements in their unassembled condition.
Figure 4:
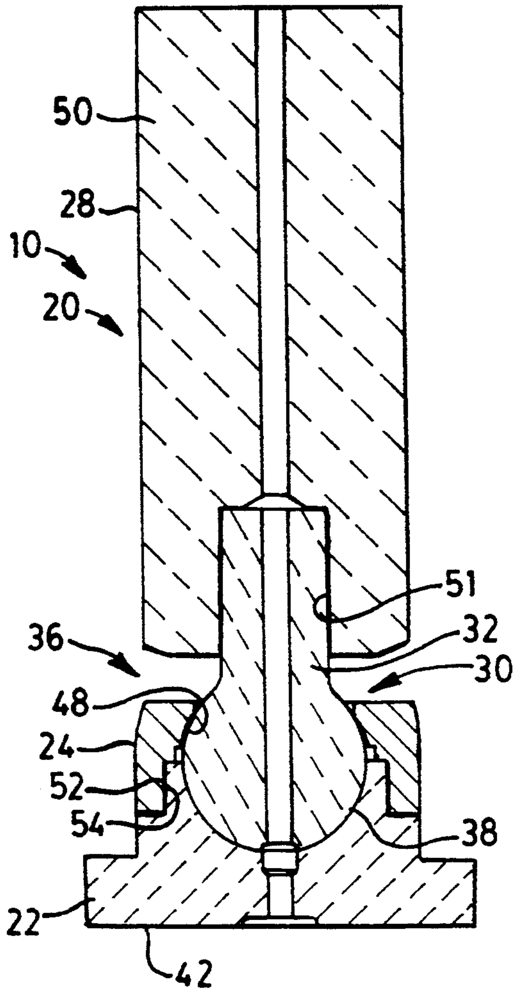
FIG. 4 is a diagrammatic representation of the components of FIG. 3 in their fully assembled condition.

Referring to FIGS. 3 and 4, another embodiment of the piston assembly 10 is illustrated. All like elements have like element numbers. When comparing FIG. 3 with that of FIG. 1, the ceramic piston 20 is a two-piece piston composed of the cylindrical body 28 and a separate head portion 30. The cylindricl body 28 is composed of a piston sleeve 50 having a bore 51 defined in one end thereof. The shaft 32 of the head portion 30 is of a size sufficient to mate with the bore 51 and be bonded therein. The ceramic slipper 22 of the embodiment of FIGS. 3 and 4, has the substantially flat surface 42 at one end thereof and the spherical cavity 44 at the other end and is likewise of a size sufficient to mate with the spherical head 38 of the head portion 30. The ceramic slipper 22 has a cylindrical outer surface 52 disposed thereon at the other end thereof adjacent the spherical cavity 44.

The cylindrical ring 24 of the embodiment of FIGS. 3 and 4 is a single piece ring made from a deformable metallic material and has an cylindrical portion 53 extending therefrom with a cylindrical inner surface 54 disposed thereon of a size sufficient to mate with the cylindrical outer surface 52 of the ceramic slipper 22. The cylindrical inner surface 54 of the cylindrical ring 24 is bonded to the cylindrical outer surface 52 of the ceramic slipper 22. In a well known manner, the deformable metallic ring is mechanically swaged so that the retaining surface 48 is forced inward to contact the spherical head 38 thus retaining the head portion 30 within the cavity 44.

Figure 5:
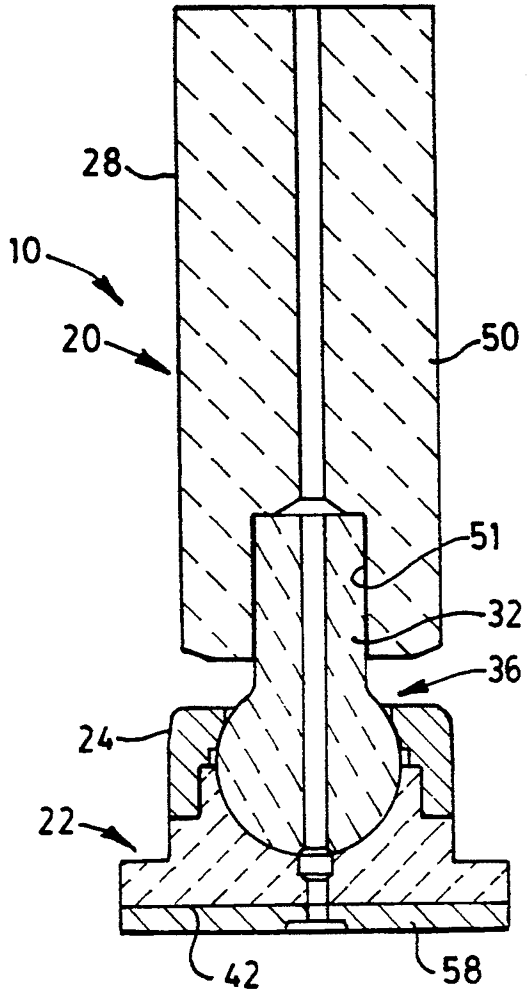
FIG. 5 is a diagrammatic representation of a modified form of the piston assembly of FIG. 4.

Referring to FIG. 5, another embodiment of the subject invention is illustrated. All like elements have like element numbers. The piston assembly 10 illustrated in FIG. 5 is substantially the same as the piston assembly 10 described with respect to FIGS. 3 and 4. The main difference of the piston assembly 10 of FIG. 5 is a substantially flat metallic member 58 is bonded to the flat surface 42 of the ceramic slipper 22. The flat metallic member 58, as illustrated, is made from a bronze material. It is recognized that the metallic member 58 could be spray deposited or applied by some other form of coating.

Figure 6:
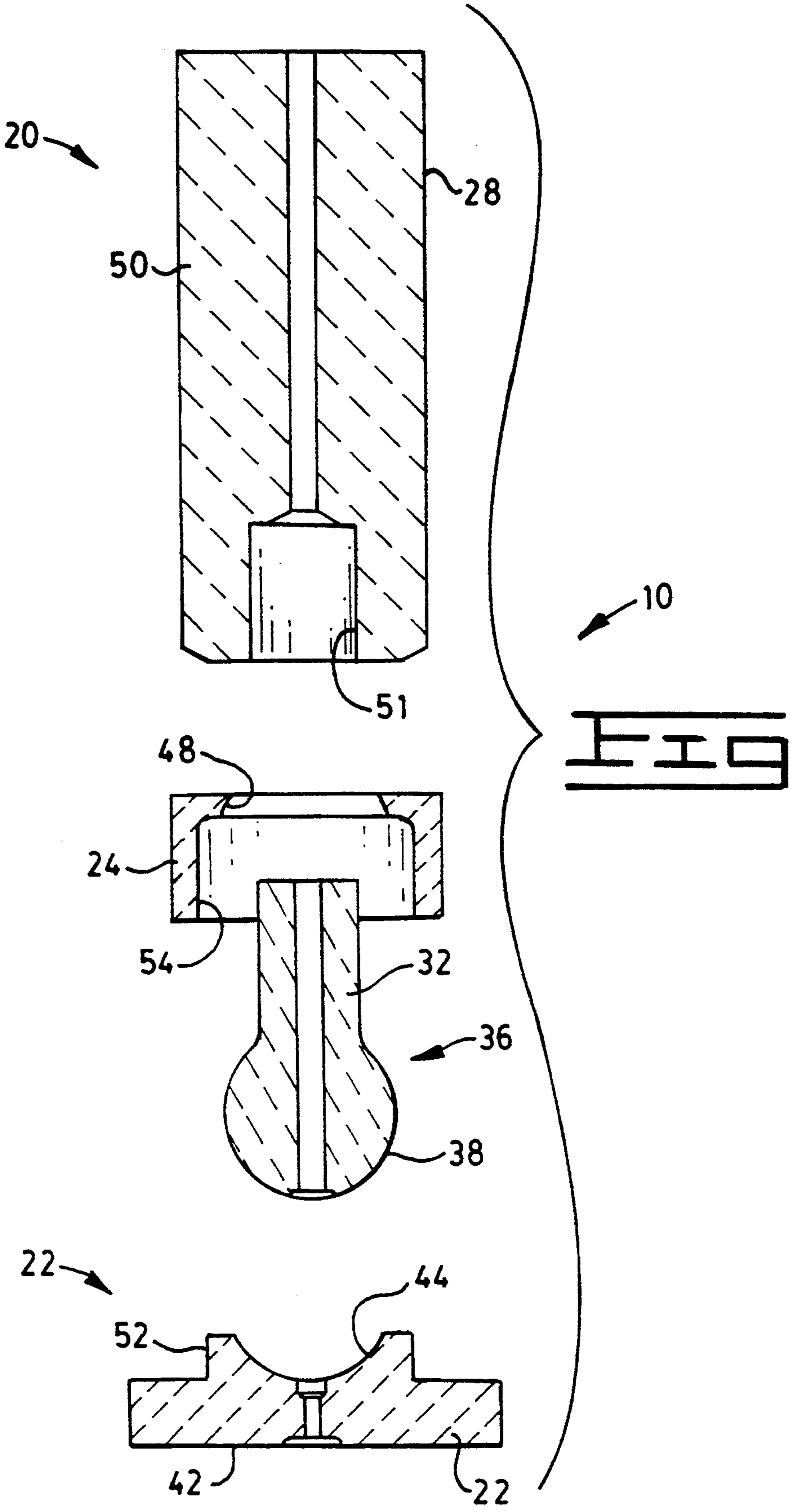
FIG. 6 is a diagrammatic representation of another embodiment of the present invention illustrating all of the elements in their unassembled condition.
Figure 7:
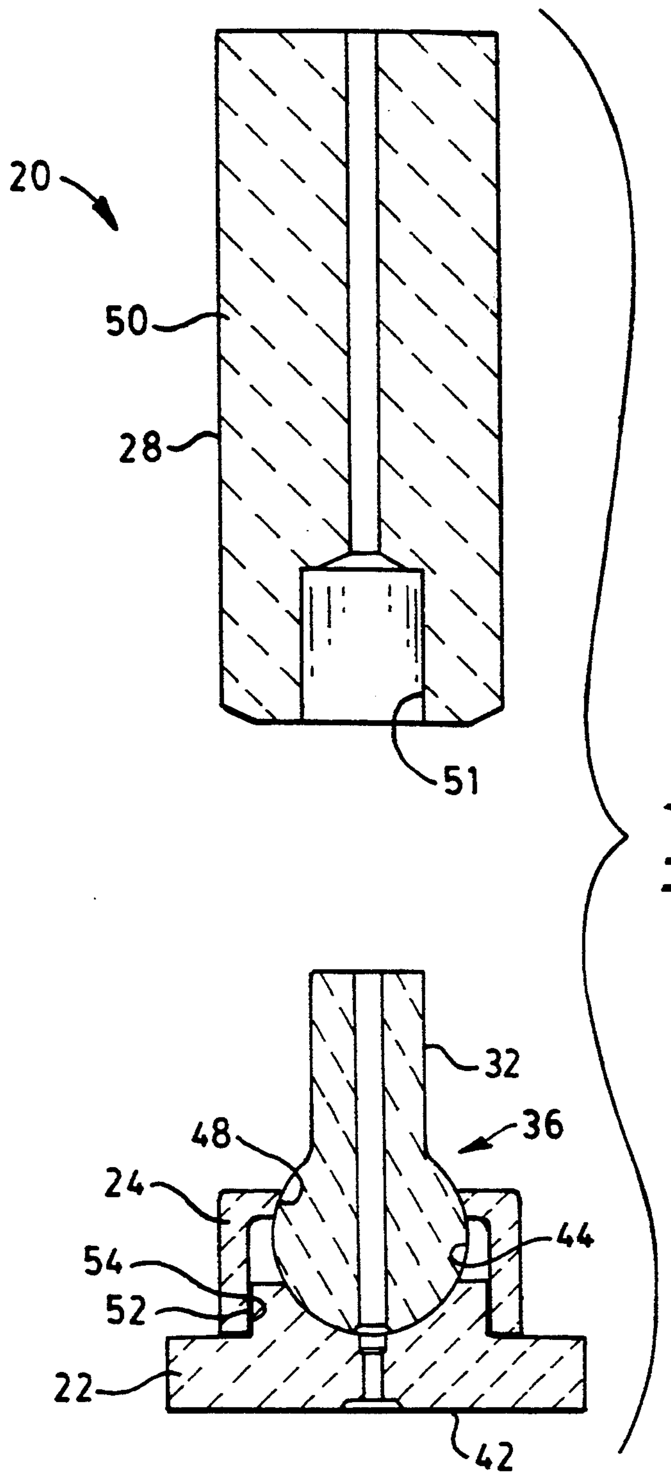
FIG. 7 is a diagrammatic representation of the components of FIG. 6 with some of the elements in their assembled condition.
Figure 8:
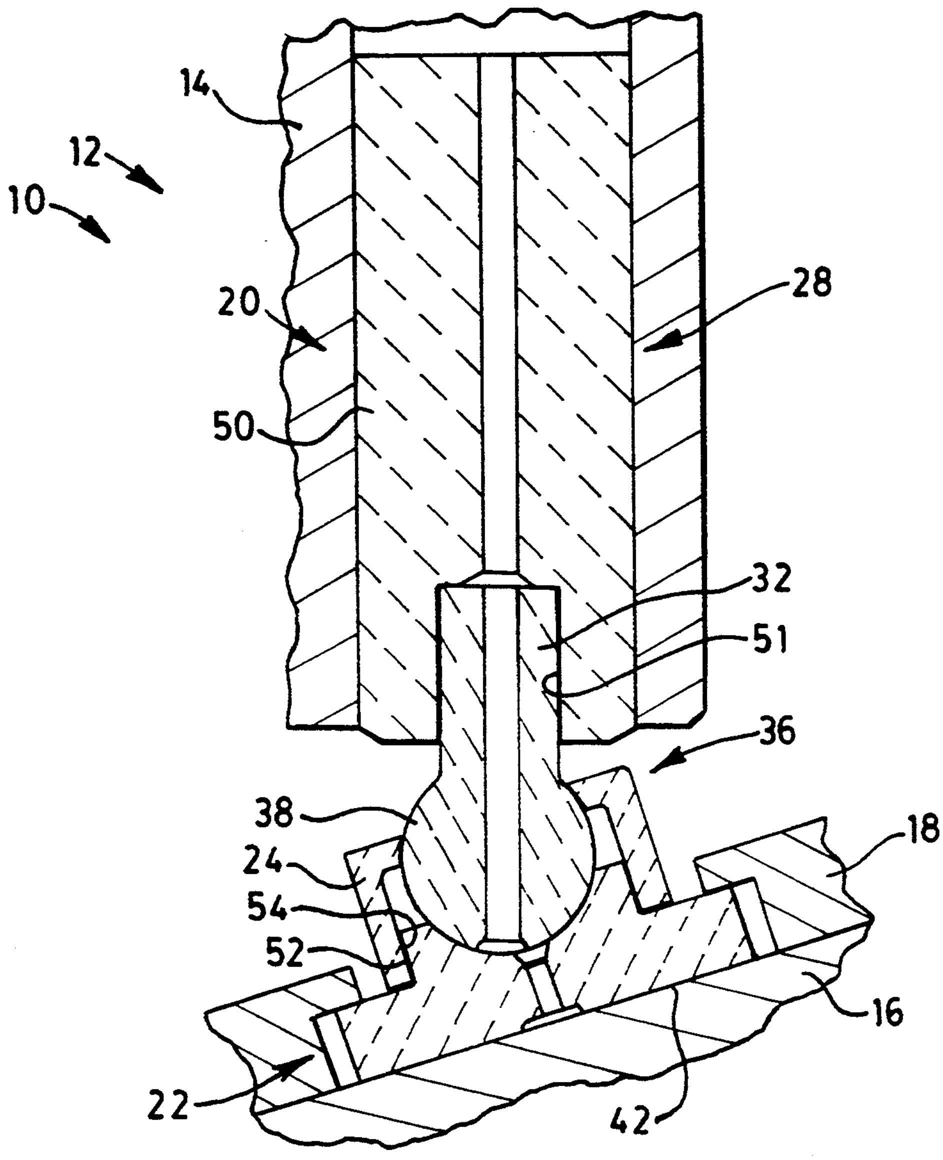
FIG. 8 is a diagrammatic representation of the fully assembled components of FIG. 7 illustrated in their operating environment.

Referring now to FIG. 6, 7 and 8, yet another embodiment of the subject invention is illustrated. All like elements have like element numbers. The piston assembly 10 illustrated in FIGS. 6–8 includes the ceramic piston sleeve 50 with the bore 51 in one end thereof, the ceramic spherical head member 36 having the spherical head 38 with the shaft 32 extending therefrom, the ceramic slipper 22 and a one-piece cylindrical ring 24. The one-piece cylindrical ring 24 of the subject embodiment is a ceramic cylindrical ring. Likewise, in the subject embodiment the one-piece ceramic cylindrical ring 24 is placed over the shaft 32 of the ceramic spherical head member 36 prior to the shaft 32 being bonded in the bore 51 of the ceramic piston sleeve 50, as illustrated in FIG. 7. The inner cylindrical surface 54 of the one-piece ceramic cylindrical ring 24 is bonded to the cylindrical outer surface 52 of the ceramic slipper 22 thus retaining the spherical head 38 in the spherical cavity 44. Thereafter, as illustrated in FIG. 8, the shaft 32 of the ceramic spherical head member 36 is inserted into the bore 51 of the ceramic piston sleeve 50 and bonded thereto to complete the piston assembly 10.

It is recognized that various forms of the piston assembly 10 could be utilized without departing from the essence of the invention. For example, the substantially flat metallic member 58 as illustrated in FIG. 5 could be utilized in any of the other embodiments. Likewise, the single-piece metallic cylindrical ring 24, as illustrated in FIGS. 3–5, could be made of a steel material and/or an aluminum alloy material.

INDUSTRIAL APPLICABILITY

During the assembly of the piston assembly 10 illustrated in FIGS. 1 and 2, the ceramic spherical head 38 of the one-piece ceramic piston 20 is positioned in the spherical cavity 44 followed by the two-piece, split ceramic cylindrical ring 24 being positioned in the spherical cavity 44 so that the retaining surface 48 of the split ceramic cylindrical ring 24 is in contact with a portion of the spherical head 38 and the split ceramic cylindrical ring 24 is then bonded to the cylindrical surface 46.

Once assembled, the ceramic piston assembly 10 is ready to be installed in the fluid translating device 12 so that the ceramic piston 20 is positioned within the barrel 14 and the ceramic slipper 22 is retained against the swashplate 16 by the retainer 18.

Referring to the embodiment illustrated in FIGS. 3 and 4, the shaft 32 of the ceramic spherical head member 36 is bonded in the bore 51 of the ceramic piston sleeve 50. In this embodiment, the inner cylindrical surface 54 of the single-piece deformable metallic ring 24 is bonded to the cylindrical outer surface 52 of the ceramic slipper 22. The spherical head 38 of the ceramic piston 20 is positioned in the spherical cavity 44 of the ceramic slipper 22 and subsequent thereto, the single-piece deformable metallic ring 24 is swaged inwardly so that the retaining surface 48 thereof contacts a portion of the spherical head 38, thus, retaining the spherical head 38 in the spherical cavity 44. The swaging operation completes the assembly of the piston assembly 10 illustrated in FIGS. 3 and 4.

In the embodiment illustrated in FIG. 5, an additional step is included. In this embodiment, the substantially flat metallic member 58 is bonded to the substantially flat surface 42 located at the one end of the ceramic slipper 22.

Referring to the assembly of the embodiment illustrated in FIGS. 6–8, the spherical head 38 of the ceramic spherical head member 36 is positioned in the spherical cavity 44 of the ceramic slipper 22 and the single-piece ceramic cylindrical ring 24 is positioned over the shaft 40 of the ceramic spherical head member 36 so that the inner cylindrical surface 54 of the single-piece ceramic cylindrical ring is disposed about the cylindrical outer surface 52 of the ceramic slipper 22 until the retaining surface 48 of the single-piece ceramic cylindrical ring 24 contacts the surface of the spherical head 38. The inner cylindrical surface 54 is bonded to the cylindrical outer surface 52 to retain the ceramic spherical head 38 in the spherical cavity Subsequent to bonding the single-piece ceramic cylindrical ring 24 to the ceramic slipper 22, the shaft 32 of the ceramic spherical head member 36 is bonded in the bore 51 of the ceramic piston sleeve 50 to complete the assembly.

Various types of adhesives could be utilized for bonding the ceramic elements to one another and likewise various adhesives could be utilized to bond the metal elements to the ceramic elements. One particular adhesive that has been successfully utilized for bonding the ceramic elements noted herein is UNISET G909 marketed by Emerson & Cuming Inc. An adhesive that has been successfully utilized to bond the metallic elements to the ceramic elements is CAT EPOXY 77 marketed by Caterpillar Inc.

In view of the foregoing, it is readily apparent that the structure of the present invention provides a piston assembly for use in fluid translating devices wherein most, if not all, of the elements are made from a ceramic material. The ceramic material reduces sliding friction and wear between the ceramic elements and the other elements that it slides in and/or on. Futhermore, the ceramic elements do not have high thermal expansion from the effects of high operating temperatures. Consequently, operating clearances can be held to a minimum. Additionally, the inertia of the piston assembly is reduced since the components thereof are made from lighter ceramic materials.

Other aspects, objects and advantages of this invention can be obtained through a study of the drawing, the disclosure, and the appended claims.

We claim;

1. A piston assembly adapted for use in a fluid translating device, comprising:

a ceramic piston having a cylindrical body with a spherical head portion disposed at one end of the cylindrical body;

a ceramic slipper having a substantially flat surface at one end and a spherical cavity defined in the other end, the spherical cavity being of a size sufficient to matingly receive the spherical head portion of the ceramic piston; and a cylindrical ring fixedly bonded to the ceramic slipper adjacent the spherical cavity and having a retaining surface disposed on the cylindrical ring, the retaining surface being operative to engage a portion of the spherical head portion to retain the spherical head portion in the spherical cavity.

2. The piston assembly of claim 1 wherein the ceramic slipper has a cylindrical surface at the entrance of the spherical cavity and the cylindrical ring is a ceramic two-piece split ring disposed in the cavity in mating contact with a portion of the spherical head portion and bonded to the cylindrical surface of the ceramic slipper.

3. The piston assembly of claim 1 wherein the ceramic slipper has a cylindrical outer surface on the end thereof adjacent the spherical cavity, the ceramic piston is composed of a piston sleeve having a bore defined in one end thereof and a ceramic spherical head member having a spherical head with a shaft extending therefrom of a size sufficient to mate with and be bonded in the bore of the ceramic piston sleeve, and the cylindrical ring is a single-piece ceramic ring disposed over the shaft of the spherical head member and has a cylindrical portion extending therefrom with an inner cylindrical surface disposed on the cylindrical portion, the inner cylindrical surface being of a size sufficient to mate with and be bonded to the outer cylindrical surface of the ceramic slipper to retain the spherical head member in the spherical cavity.

4. The piston assembly of claim 1 wherein the ceramic slipper has a substantially flat metallic member bonded to the substantially flat surface thereof.

5. The piston assembly of claim 1 wherein the slipper has an outer cylindrical surface adjacent the spherical cavity and the cylindrical ring is a deformable metallic ring having a first inner cylindrical surface of a size to mate with and be bonded to the outer cylindrical surface of the ceramic slipper and the retaining surface is of a size to freely permit the spherical head portion of the ceramic piston to pass therethrough and subsequently be deformed to engage the portion of the spherical head portion to retain the spherical head portion in the spherical cavity.

* * * * *